United States Patent [19]

Fazzini

[11] 4,283,853

[45] Aug. 18, 1981

[54] CUTTING TOOL

[76] Inventor: Daniel B. Fazzini, 1877 Mathews Rd., Youngstown, Ohio 44514

[21] Appl. No.: 132,910

[22] Filed: Mar. 24, 1980

[51] Int. Cl.³ .......................................... B26B 13/00
[52] U.S. Cl. ...................................... 30/265; 30/287; 30/292; 30/294; 30/317
[58] Field of Search ................... 30/279 R, 287, 292, 30/294, 299, 306, 307, 319, 317, 289, 286, 265

[56] References Cited

U.S. PATENT DOCUMENTS

| | | | |
|---|---|---|---|
| 742,946 | 11/1903 | Wineman et al. | 30/265 |
| 769,081 | 8/1904 | Hemington | 30/265 |
| 864,105 | 8/1907 | Palmer | 30/319 |
| 1,098,671 | 6/1914 | Lundy | 30/265 |
| 1,229,120 | 6/1917 | Montgomery | 30/265 |
| 1,328,547 | 1/1920 | Shaw | 30/294 |
| 1,511,892 | 10/1924 | Lusby | 30/265 |
| 1,720,305 | 7/1929 | Tjernlund | 30/265 |
| 2,308,148 | 1/1943 | Bancroft | 30/292 |
| 3,028,670 | 4/1962 | Tilly | 30/294 |
| 4,156,968 | 6/1979 | Gould et al. | 30/307 |

FOREIGN PATENT DOCUMENTS

| | | | |
|---|---|---|---|
| 151209 | 4/1953 | Australia | 30/294 |
| 511154 | 1/1955 | Italy | 30/265 |
| 521582 | 1/1977 | Japan | 30/292 |

OTHER PUBLICATIONS

IBM Technical Disclosure Bulletin, vol. 2, No. 1, Jun. 1959, p. 8.

Primary Examiner—Stephen G. Kunin
Assistant Examiner—J. T. Zatarga
Attorney, Agent, or Firm—Webster B. Harpman

[57] ABSTRACT

A cutting tool which may be pulled through sheet material to be cut has a pair of spaced circular cutting blades on a first shaft and a single circular cutting blade on a second shaft spaced vertically with respect to the first shaft and wherein both shafts are secured to a vertically standing flat body member in which a cutaway portion including a beveled surface defines paths for the work piece and a narrow section of material cut therefrom by the cutting tool.

4 Claims, 3 Drawing Figures

CUTTING TOOL

BACKGROUND OF THE INVENTION (1) Field of the Invention

This invention relates to cutting tools having spaced apart rotary blades for cutting sheet material such as sheet plastic, sheet metal, various laminates and the like.

(2) Description of the Prior Art

Cutting tools heretofore known are best illustrated in the following U.S. Pat. Nos.: 769,081; 1,098,671; 1,511,892; 1,720,305 and 2,134,536. In each of these patents cutting devices utilizing rotary cutters are disclosed, the rotary cutters comprising a pair of spaced circular blades arranged in overlapping relation at their point of contact with the material to be cut and acting to cut a single cut line in the work piece to separate it into two portions.

In U.S. Pat. No. 2,134,536 positioning flanges of the same diameter as the circular cutting blades are used to attempt to position the paper of the envelope being cut with respect to the circular cutting blades.

In the present invention, sharp clean edges of the work piece being cut are obtained by cutting away a very narrow section with the cutting tool by reason of the arrangement of a pair of spaced circular cutting blades on a first shaft and a single circular cutting blade on a second shaft spaced thereabove with the cut lines being formed, in the material being cut, by both edges of the single circular cutting blade where it engages the area between the spaced circular cutting blades. The cutting tool as disclosed herein when pulled through the sheet material of the work piece is properly aligned and positioned with respect thereto by the vertically standing body member and a slot therein between the circular cutting blades which terminates in a beveled surface guiding the cut section of material out and away from the cutting area.

SUMMARY OF THE INVENTION

A cutting tool comprises a vertically standing body member having an elongated flat guiding surface and a slot extending axially therefrom and a pair of circular cutting blades rotatably mounted below the slot and a single circular cutting tool rotatably positioned above the slot with the peripheral edges of the cutting blades in closely spaced relation to one another, the arrangement being such that pulling the cutting tool through sheet material, such as laminated plastic, linoleum or vinyl flooring or the like, will cut a single narrow section therefrom and leave clean smooth edges of the cutaway sections.

DESCRIPTION OF THE PREFERRED EMBODIMENT

The invention disclosed herein takes the form of a vertically standing body member 10 having an upwardly formed semi-circular cutaway area 11 therein which communicates with a longitudinally extending slot 12, a forward end portion of which is angularly disposed as at 13 and enlarged at its innermost end to define a beveled guiding surface 14.

Figure 2:
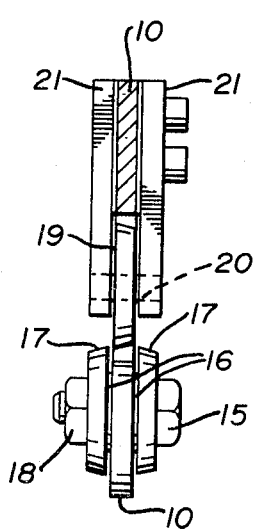
FIG. 2 is a vertical section on line 2—2 of FIG. 1.

The portion of the vertically standing body member 10 lying below the slot 12 is apertured so as to position a bolt 15 which as best seen in FIG. 2 of the drawings has a pair of spacing washers 16 and a pair of circular cutting blades 17, a washer and a blade being positioned on either side of the vertically standing body member 10 and rotatably secured by a nut 18 on the bolt 15. The peripheral edges of the circular cutting blade 17 are angled at approximately 6° from horizontal and the blades are positioned on the bolt 15 in oppositely disposed relation to one another with the areas of largest diameter lying adjacent the washers 16. A single circular cutting blade 19 is positioned in the upwardly formed semi-circular cutaway area 11 of the vertically standing body memeber by means of a pin 20 secured in apertures in a pair of support arms 21 which in turn are adjustably attached for vertical movement to rhe opposite sides of the upstanding body member 10 by a pair of secondary bolts 22. The single circular cutting blade 19 has its peripheral edge formed on an angle of apporoximately 6° from horizontal and at its point of engagement with the pair of spaced circular cutting blades 17, said angular edge forms an offset angular continuation with respect to the angular cutting edge of one of the pair of circular cutting blades 17 as best seen in FIG. 2 of the drawings.

Figure 1:
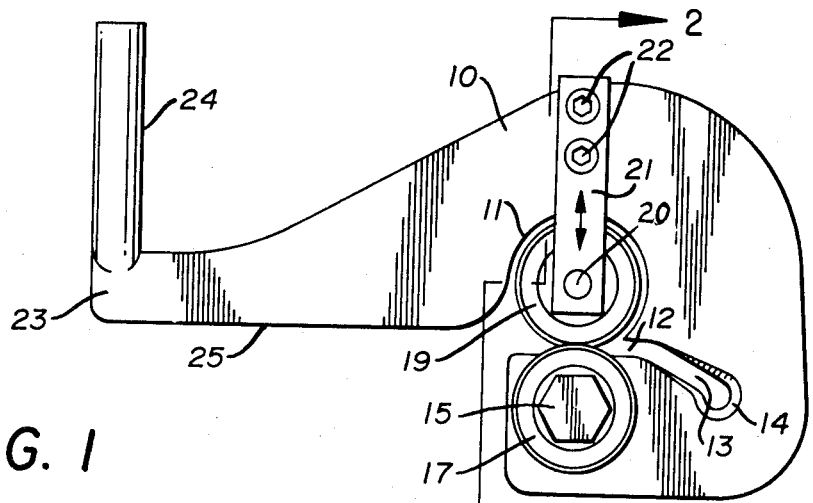
FIG. 1 is a side elevation of the cutting tool.

By referring again to FIG. 1 of the drawings, it will be seen that the vertically standing body member 10 has an elongated section 23 extending to the left of the cutaway area 11 therein with a vertically standing handle 24 attached to the outermost end thereof. The bottom 25 of the extension 23 of the vertically standing body member 10 is horizontally disposed and is in substantial alignment with the upper wall of the body member 10 defining the slot 12 heretofore referred to.

Figure 3:
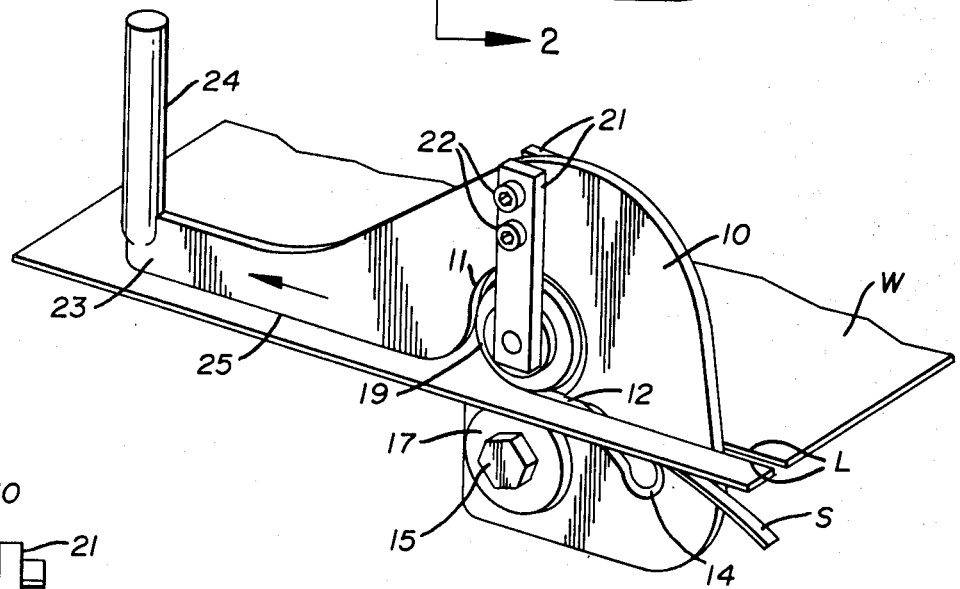
FIG. 3 is a perspective elevation of the cutting tool in position on a work piece.

By referring now to FIG. 3 of the drawings, the cutting tool as disclosed herein will be seen in position on a work piece of sheet material being cut thereby. In FIG. 3 the work piece is indicated by the letter W with a narrow strip S being cut therefrom so as to form smooth straight cut lines L in the work piece W. The narrow strip S has engaged the tapered surface 14 formed in the enlarged inner end of the slot 12 and been guided to one side of the portion of the body member 10 in which the slot 12 is formed and the two cut sections of the work piece W therefore remain on an even common horizontal plane as the cutting tool is moved therethrough, to the left, as seen in FIG. 3 of the drawings.

It will occur to those skilled in the art that the work piece may be of varying thicknesses, such as for example multiple laminated, plastic or plastic impregnated materials such as used in counter tops and the like and/or a single thickness of a vinyl floor covering or the like and that it is therefore necessary that the single circular cutting blade 19 be adjustably disposed to accommodate the changes in the thickness of the work piece. The loosening of the bolts 22 will permit the support arms 21 which carry the pin 20 and the single circular cutting blade 19 to be moved vertically and repositioned as desired.

It will thus be seen that a cutting tool has been disclosed which has several unique features which contribute to its successful operation as follows:

The location of the single circular cutting blade 19 in the cutaway area 11 of the body member 10 above and forwardly of the slot 12 with its enlarged inner end and its tapered surface which results in directing a cutaway strip away from the tool and the work piece as the tool moves progressively therethrough. The arrangement of the pair of spaced circular cutting blades 17 so that their beveled peripheral edges lie in closely spaced relation to the beveled peripheral edge of the single cutting blade 19 which is partially overlapped with respect thereto by being positioned partly therebetween and the ability of the tool to be adjusted to accommodate work pieces of various thicknesses, all of which contributes to the efficiency of the cutting tool disclosed herein and its ability to form a perfect double cut line in a work piece and thus form desirable smooth edges on the cut sections of the work piece.

Although but one embodiment of the present invention has been illustrated and described, it will be apparent to those skilled in the art that various changes and modifications may be made therein without departing from the spirit of the invention and having thus described my invention what I claim is:

1. A cutting tool comprising an elongated vertically standing body member having oppositely disposed ends with an upstanding handle portion on one of its ends and having an upwardly extending semi-circular cutaway area therein inwardly of the other of its ends communicating with a slot extending toward said other end so that a first part of said body member lies below the semi-circular cutaway area and the slot and a second part thereof lies above the semi-circular cutaway area and the slot, a pair of spaced circular cutting blades, means for mounting said pair of circular cutting blades on said first part with one blade on either side of said first part with their upper peripheral edges in said semi-circular cutaway area, a single circular cutting blade, secondary means on said second part mounting said single circular cutting blade in said semi-circular cutaway area with the lower peripheral edges of said single circular cutting blade engaging the uppermost peripheral edges of said pair of circular cutting blades whereby movement of said cutting tool along the upper surface of a work piece to be cut causes said circular cutting blades to form a double cut line in said work piece by separating a narrow strip therefrom.

2. The cutting tool combination set forth in claim 1 and wherein said secondary means mounting the single circular cutting blade consists of a pair of support arms attached to the opposite sides of said vertically standing body member and a pin positioned in apertures in said support arms and journaling said single circular cutting blade.

3. The cutting tool combination set forth in claim 1 and wherein said slot is angularly positioned with respect to the axis of the elongated body member so as to extend downwardly into said first part to form an angular guide.

4. The cutting tool combination set forth in claim 3 and wherein the end of said slot is enlarged and the enlarged end wall thereof is tapered.

* * * * *